US008548157B2

(12) United States Patent
Brandt et al.

(10) Patent No.: US 8,548,157 B2
(45) Date of Patent: Oct. 1, 2013

(54) SYSTEM AND METHOD OF MANAGING INCOMING TELEPHONE CALLS AT A CALL CENTER (75) Inventors: Jeffrey L. Brandt, Cedar Park, TX (US); Aaron W. Bangor, Austin, TX (US); Douglas F. Reynolds, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1938 days.

(21) Appl. No.: 11/214,451

(22) Filed: Aug. 29, 2005

(65) Prior Publication Data

US 2007/0047720 A1  Mar. 1, 2007

(51) Int. Cl.
*H04M 3/00* (2006.01)
*H04M 5/00* (2006.01)

(52) U.S. Cl.
USPC ............ 379/266.01; 379/266.03; 379/266.06

(58) Field of Classification Search
USPC ............ 379/265.01, 265.02, 266.01, 266.03, 379/266.06, 266.07, 266.08
See application file for complete search history.

(56) References Cited

U.S. PATENT DOCUMENTS

| | | | |
|---|---|---|---|
| 4,953,204 A | 8/1990 | Cuschleg, Jr. | |
| 4,967,405 A | 10/1990 | Upp | |
| 5,335,269 A | 8/1994 | Steinlicht | |
| 5,455,903 A | 10/1995 | Jolissaint | |
| 5,497,373 A | 3/1996 | Hulen | |
| 5,522,046 A | 5/1996 | McMillen | |
| 5,530,744 A | 6/1996 | Charalambous | |
| 5,555,299 A | 9/1996 | Maloney | |
| 5,652,789 A | 7/1997 | Miner | |
| 5,754,639 A | 5/1998 | Flockhart | |
| 5,754,978 A | 5/1998 | Perez-Mendez | |
| 5,923,745 A | 7/1999 | Hurd | |
| 5,940,476 A | 8/1999 | Morganstein | |
| 5,946,388 A * | 8/1999 | Walker et al. ............ 379/266.01 |
| 5,953,704 A | 9/1999 | McIlroy | |
| 5,999,965 A | 12/1999 | Kelly | |

(Continued)

FOREIGN PATENT DOCUMENTS

| | | |
|---|---|---|
| EP | 0 424 015 A2 | 4/1991 |
| EP | 0 424 015 A3 | 4/1991 |

(Continued)

OTHER PUBLICATIONS

Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

*Primary Examiner* — Rasha Al Aubaidi
*Assistant Examiner* — Nafiz E Hoque
(74) *Attorney, Agent, or Firm* — Toler Law Group, PC (57) ABSTRACT A method of managing incoming calls is disclosed and includes receiving a telephone call. Further, the method includes offering a caller a bypass option to bypass an automated help application and placing the telephone call in a queue for a next available customer service agent. The method can also include prompting the caller for payment when the caller selects the bypass option. Further, the method can include indicating a current wait time when the bypass option is declined. Moreover, the method can include offering the caller an instant service option to directly connect the caller to a customer service agent. The method can also include prompting the caller for payment when the caller selects the instant service option and directly connecting the telephone call to a customer service agent.

18 Claims, 7 Drawing Sheets (56) References Cited

U.S. PATENT DOCUMENTS

| | | | |
|---|---|---|---|
| 6,002,689 A | 12/1999 | Christie | |
| 6,002,760 A | 12/1999 | Gisby | |
| 6,003,011 A | 12/1999 | Sarin | |
| 6,014,439 A * | 1/2000 | Walker et al. | 379/266.01 |
| 6,049,594 A | 4/2000 | Furman | |
| 6,118,866 A | 9/2000 | Shtivelman | |
| 6,119,101 A | 9/2000 | Peckover | |
| 6,173,266 B1 | 1/2001 | Marx | |
| 6,173,289 B1 | 1/2001 | Sonderegger | |
| 6,173,399 B1 | 1/2001 | Gilbrech | |
| 6,175,621 B1 | 1/2001 | Begeja | |
| 6,222,920 B1 * | 4/2001 | Walker et al. | 379/266.01 |
| 6,259,786 B1 | 7/2001 | Gisby | |
| 6,269,153 B1 | 7/2001 | Carpenter | |
| 6,317,439 B1 | 11/2001 | Cardona | |
| 6,333,980 B1 | 12/2001 | Hollatz | |
| 6,353,608 B1 | 3/2002 | Cullers | |
| 6,366,658 B1 | 4/2002 | Bjornberg | |
| 6,366,668 B1 | 4/2002 | Borst | |
| 6,381,329 B1 | 4/2002 | Uppaluru | |
| 6,385,584 B1 | 5/2002 | McAllister | |
| 6,389,400 B1 | 5/2002 | Bushey et al. | |
| 6,400,804 B1 | 6/2002 | Bilder | |
| 6,400,996 B1 | 6/2002 | Hoffberg | |
| 6,405,159 B2 | 6/2002 | Bushey | |
| 6,414,966 B1 | 7/2002 | Kulkarni | |
| 6,418,424 B1 | 7/2002 | Hoffberg | |
| 6,442,247 B1 | 8/2002 | Garcia | |
| 6,510,414 B1 | 1/2003 | Chaves | |
| 6,519,562 B1 | 2/2003 | Phillips | |
| 6,529,871 B1 | 3/2003 | Kanevsky | |
| 6,546,087 B2 | 4/2003 | Shaffer | |
| 6,553,113 B1 | 4/2003 | Dhir | |
| 6,570,967 B2 | 5/2003 | Katz | |
| 6,584,180 B2 | 6/2003 | Nemoto | |
| 6,587,556 B1 | 7/2003 | Judkins | |
| 6,598,136 B1 | 7/2003 | Norrod | |
| 6,600,736 B1 | 7/2003 | Ball | |
| 6,603,854 B1 | 8/2003 | Judkins | |
| 6,614,781 B1 | 9/2003 | Elliott | |
| 6,631,186 B1 | 10/2003 | Adams et al. | |
| 6,678,360 B1 | 1/2004 | Katz | |
| 6,678,718 B1 | 1/2004 | Khouri | |
| 6,690,788 B1 | 2/2004 | Bauer | |
| 6,694,012 B1 | 2/2004 | Posthuma | |
| 6,697,460 B2 | 2/2004 | Knott | |
| 6,700,972 B1 | 3/2004 | McHugh | |
| 6,704,404 B1 | 3/2004 | Burnett | |
| 6,707,789 B1 | 3/2004 | Arslan | |
| 6,714,631 B1 | 3/2004 | Martin | |
| 6,721,416 B1 | 4/2004 | Farrell | |
| 6,731,722 B2 | 5/2004 | Coffey | |
| 6,738,473 B1 | 5/2004 | Burg | |
| 6,744,861 B1 | 6/2004 | Pershan | |
| 6,744,877 B1 | 6/2004 | Edwards | |
| 6,751,306 B2 | 6/2004 | Himmel | |
| 6,757,306 B1 | 6/2004 | Klish, II | |
| 6,766,320 B1 | 7/2004 | Wang | |
| 6,775,359 B1 | 8/2004 | Ron | |
| 6,778,643 B1 | 8/2004 | Bushey | |
| 6,792,096 B2 | 9/2004 | Martin | |
| 6,801,520 B2 * | 10/2004 | Philonenko | 370/351 |
| 6,807,274 B2 | 10/2004 | Joseph | |
| 6,823,307 B1 | 11/2004 | Steinbiss | |
| 6,831,932 B1 | 12/2004 | Boyle | |
| 6,832,224 B2 | 12/2004 | Gilmour | |
| 6,842,504 B2 | 1/2005 | Mills | |
| 6,847,711 B2 | 1/2005 | Knott | |
| 6,847,714 B2 * | 1/2005 | Das et al. | 379/265.12 |
| 6,847,715 B1 * | 1/2005 | Swartz | 379/266.01 |
| 6,853,722 B2 | 2/2005 | Joseph | |
| 6,853,966 B2 | 2/2005 | Bushey | |
| 6,856,679 B2 | 2/2005 | Pennington, Jr. | |
| 6,859,529 B2 | 2/2005 | Duncan | |
| 6,871,212 B2 | 3/2005 | Khouri | |
| 6,879,683 B1 | 4/2005 | Fain | |
| 6,885,734 B1 | 4/2005 | Eberle | |
| 6,891,932 B2 | 5/2005 | Bhargava | |
| 6,895,083 B1 | 5/2005 | Bers | |
| 6,901,366 B1 | 5/2005 | Kuhn | |
| 6,907,119 B2 | 6/2005 | Case | |
| 6,915,246 B2 | 7/2005 | Gusler | |
| 6,922,689 B2 | 7/2005 | Shtivelman | |
| 6,963,983 B2 | 11/2005 | Munson | |
| 6,964,023 B2 | 11/2005 | Maes | |
| 6,978,006 B1 * | 12/2005 | Polcyn | 379/265.12 |
| 7,006,605 B1 | 2/2006 | Morganstein | |
| 7,012,888 B2 | 3/2006 | Schoeneberger | |
| 7,013,112 B2 | 3/2006 | Haller | |
| 7,027,586 B2 | 4/2006 | Bushey | |
| 7,031,444 B2 | 4/2006 | Shen | |
| 7,035,388 B2 | 4/2006 | Kurosaki | |
| 7,050,560 B2 | 5/2006 | Martin | |
| 7,062,018 B2 | 6/2006 | Martin | |
| 7,065,201 B2 | 6/2006 | Bushey | |
| 7,076,049 B2 | 7/2006 | Bushey | |
| 7,080,323 B2 | 7/2006 | Knott | |
| 7,092,370 B2 | 8/2006 | Jiang | |
| 7,095,827 B2 | 8/2006 | Guedalia | |
| 7,095,842 B2 | 8/2006 | Brown | |
| 7,107,232 B2 | 9/2006 | Morris | |
| 7,120,244 B2 | 10/2006 | Joseph | |
| 7,131,117 B2 | 10/2006 | Mills | |
| 7,139,369 B2 | 11/2006 | Martin | |
| 7,142,652 B2 | 11/2006 | Ho | |
| 7,146,383 B2 | 12/2006 | Martin | |
| 7,170,992 B2 | 1/2007 | Knott | |
| 7,174,011 B2 | 2/2007 | Kortum | |
| 7,184,534 B2 | 2/2007 | Birch | |
| 7,197,130 B2 | 3/2007 | Paden | |
| 7,242,751 B2 | 7/2007 | Bushey | |
| 7,245,711 B2 | 7/2007 | Margolis | |
| 7,245,716 B2 * | 7/2007 | Brown et al. | 379/266.01 |
| 7,249,321 B2 | 7/2007 | Bushey | |
| 7,272,222 B2 | 9/2007 | Joseph | |
| 7,305,070 B2 | 12/2007 | Kortum | |
| 7,349,527 B2 | 3/2008 | Yacoub | |
| 7,356,139 B2 | 4/2008 | Turcan | |
| 7,356,475 B2 | 4/2008 | Novack | |
| 7,376,228 B2 | 5/2008 | Haug, Jr. | |
| 7,379,537 B2 | 5/2008 | Bushey | |
| 7,383,170 B2 | 6/2008 | Mills | |
| 7,398,212 B2 | 7/2008 | Yacoub | |
| 7,415,101 B2 | 8/2008 | Bushey | |
| 7,415,106 B2 | 8/2008 | Chang | |
| 7,418,095 B2 | 8/2008 | Knott | |
| 7,450,698 B2 | 11/2008 | Bushey | |
| 7,512,545 B2 | 3/2009 | Knott | |
| 7,545,925 B2 | 6/2009 | Williams | |
| 7,551,723 B2 | 6/2009 | Mills | |
| 7,573,999 B2 | 8/2009 | Turcan | |
| 2001/0018672 A1 | 8/2001 | Petters | |
| 2001/0032229 A1 | 10/2001 | Hulls | |
| 2002/0046030 A1 | 4/2002 | Haritsa | |
| 2002/0059169 A1 | 5/2002 | Quarterman | |
| 2002/0067714 A1 | 6/2002 | Crain | |
| 2002/0087385 A1 | 7/2002 | Vincent | |
| 2002/0133413 A1 | 9/2002 | Chang | |
| 2002/0156699 A1 | 10/2002 | Gray | |
| 2002/0165732 A1 | 11/2002 | Ezzeddine | |
| 2003/0035381 A1 | 2/2003 | Chen | |
| 2003/0069937 A1 | 4/2003 | Khouri | |
| 2003/0097428 A1 | 5/2003 | Afkhami | |
| 2003/0130864 A1 | 7/2003 | Ho | |
| 2003/0144846 A1 | 7/2003 | Denenberg | |
| 2003/0144919 A1 | 7/2003 | Trompette | |
| 2003/0165223 A1 | 9/2003 | Timmins | |
| 2003/0187732 A1 | 10/2003 | Seta | |
| 2003/0187773 A1 | 10/2003 | Santos | |
| 2003/0195753 A1 * | 10/2003 | Homuth | 705/1 |
| 2003/0204435 A1 | 10/2003 | McQuilkin | |
| 2004/0006473 A1 | 1/2004 | Mills | |
| 2004/0042592 A1 | 3/2004 | Knott | |
| 2004/0073569 A1 | 4/2004 | Knott | |

| | | |
|---|---|---|
| 2004/0083479 A1 | 4/2004 | Bondarenko |
| 2004/0103017 A1 | 5/2004 | Reed |
| 2004/0125937 A1 | 7/2004 | Turcan |
| 2004/0161078 A1 | 8/2004 | Knott |
| 2004/0230438 A1 | 11/2004 | Pasquale |
| 2004/0243568 A1 | 12/2004 | Wang |
| 2005/0015744 A1 | 1/2005 | Bushey |
| 2005/0055216 A1 | 3/2005 | Bushey |
| 2005/0075894 A1 | 4/2005 | Bushey |
| 2005/0080667 A1 | 4/2005 | Knott |
| 2005/0131892 A1 | 6/2005 | Knott |
| 2005/0141692 A1 | 6/2005 | Scherer |
| 2005/0201547 A1 | 9/2005 | Burg |
| 2005/0254632 A1 | 11/2005 | Pasquale |
| 2006/0018443 A1 | 1/2006 | Knott |
| 2006/0023863 A1 | 2/2006 | Joseph |
| 2006/0026049 A1 | 2/2006 | Joseph |
| 2006/0036437 A1 | 2/2006 | Bushey |
| 2006/0039547 A1 | 2/2006 | Klein |
| 2006/0050865 A1 | 3/2006 | Kortum |
| 2006/0062375 A1 | 3/2006 | Pasquale |
| 2006/0093097 A1 | 5/2006 | Chang |
| 2006/0100998 A1 | 5/2006 | Edwards |
| 2006/0109974 A1 | 5/2006 | Paden |
| 2006/0109976 A1 * | 5/2006 | Sundaram et al. ....... 379/265.02 |
| 2006/0115070 A1 | 6/2006 | Bushey |
| 2006/0126808 A1 | 6/2006 | Dallessandro |
| 2006/0126811 A1 | 6/2006 | Bushey |
| 2006/0153345 A1 | 7/2006 | Bushey |
| 2006/0161431 A1 | 7/2006 | Bushey |
| 2006/0177040 A1 | 8/2006 | Mitra |
| 2006/0188087 A1 | 8/2006 | Kortum |
| 2006/0198505 A1 | 9/2006 | Kortum |
| 2006/0215831 A1 | 9/2006 | Knott |
| 2006/0215833 A1 | 9/2006 | Mahoney |
| 2006/0256932 A1 | 11/2006 | Bushey |
| 2006/0256956 A1 * | 11/2006 | Lee et al. ................. 379/266.01 |
| 2006/0291642 A1 | 12/2006 | Bushey |
| 2007/0019800 A1 | 1/2007 | Bushey |
| 2007/0025528 A1 | 2/2007 | Knott |
| 2007/0025542 A1 | 2/2007 | Bushey |
| 2007/0041523 A1 | 2/2007 | Paden |
| 2007/0041538 A1 | 2/2007 | Paden |
| 2007/0041551 A1 | 2/2007 | Whitecotten |
| 2007/0047718 A1 | 3/2007 | Idler |
| 2007/0116230 A1 | 5/2007 | Brandt |
| 2007/0165830 A1 | 7/2007 | Paden |
| 2008/0008308 A1 | 1/2008 | Knott |

FOREIGN PATENT DOCUMENTS

| | | |
|---|---|---|
| EP | 0 424 015 B1 | 4/1991 |
| EP | 0 876 652 A4 | 11/1998 |
| WO | 97/26612 A1 | 7/1997 |
| WO | 01/37539 A2 | 5/2001 |
| WO | 01/37539 A3 | 5/2001 |
| WO | 2004/017584 | 4/2004 |
| WO | 2004/049222 A2 | 10/2004 |

* cited by examiner

SYSTEM AND METHOD OF MANAGING INCOMING TELEPHONE CALLS AT A CALL CENTER

FIELD OF THE DISCLOSURE

The present disclosure relates to customer call centers.

BACKGROUND

Call centers face a balancing act when choosing the level of service to provide. Typically, as the level of service increases, the cost of providing the service also increases. Additionally, some call centers may provide different levels of service for different customers and different treatment may be provided after the identity of a caller is determined. For example, in the telecommunications industry, higher paying business customers may be given better service than lower paying residential customers. However, the decision to upgrade the service is made by the call center and not the caller.

Accordingly, there is a need for an improved system and method for managing incoming telephone calls at a call center.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

A method of managing incoming calls is disclosed and includes receiving a telephone call. Further, the method includes offering a caller a bypass option to bypass an automated help application and placing the telephone call in a queue for a next available customer service agent.

In a particular embodiment, the method includes prompting the caller for payment when the caller selects the bypass option. In another particular embodiment, the method includes indicating a current wait time when the bypass option is declined. Alternatively, the method can include indicating a current wait time before offering the bypass option. In yet another particular embodiment, the method can include offering the caller an instant service option to directly connect the caller to a customer service agent. Also, the method can include prompting the caller for payment when the caller selects the instant service option and directly connecting the telephone call to a customer service agent.

In still another particular embodiment, the method includes offering the caller a reduced wait time option to reduce a wait time. Further, the method can includes prompting the caller for payment when the caller selects the reduced wait time option and advancing the telephone call in a queue. In a particular embodiment, the payment is received by adding a fee to a telephone bill associated with the caller.

In another embodiment, a method of managing incoming telephone calls is disclosed and includes receiving a telephone call at caller center and offering a caller a domestic help option to connect the telephone call to a domestic customer agent for a fee.

In yet another embodiment, a call management system is disclosed and includes a plurality of customer service agent communication devices and a queue that is coupled to the plurality of customer service agent communication devices. Moreover, the system includes an interactive voice response server that is coupled to the plurality of customer service agent communication devices via the queue. The interactive voice response server includes a processor, a computer readable medium that is accessible to the processor, and an interactive voice response application that is embedded within the computer readable medium. The interactive voice response application includes instructions to receive a telephone call and instructions to offer a bypass option to bypass an automated help application.

Figure 1:
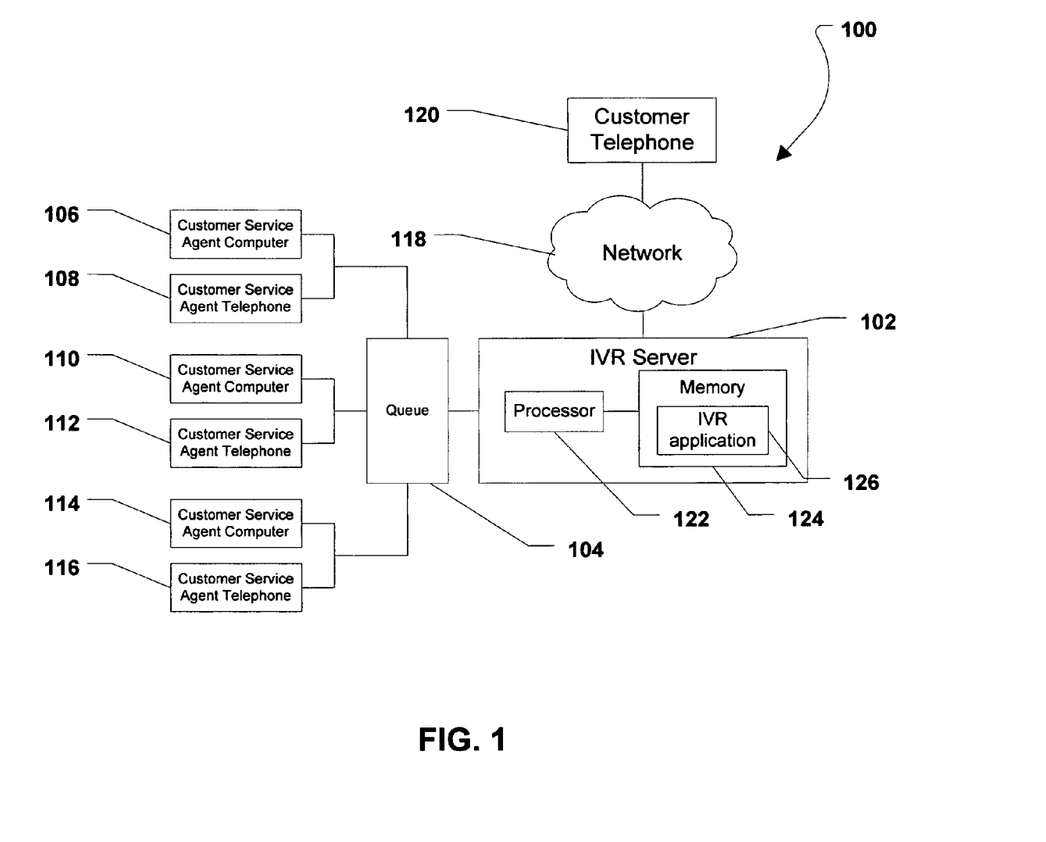
FIG. 1 is a block diagram that is representative of a call system.

Referring to FIG. 1, a call system is shown and is generally designated 100. As depicted, the system includes an interactive voice response (IVR) server 102 that is coupled to a call transfer queue 104. The call transfer queue 104 is coupled to a first customer service agent computer 106 and a first customer service agent communication device 108. As shown, the call transfer queue 104 is coupled to a second customer service agent computer 110 and a second customer service agent communication device 112. Further, the call transfer queue 104 is coupled to a third customer service agent computer 114 and a third customer service agent communication device 116. In an alternative embodiment, the call transfer queue 104 can be coupled to any number of customer service agent computers and telephones. In a particular embodiment, the customer service agent communication devices 108, 112, 116 can be telephones, terminals, headphones, voice over Internet protocol (VoIP) telephones, etc.

FIG. 1 further indicates that a network 118, e.g., a telephone network, is coupled to the IVR server 102. In a particular embodiment, the network 118 is a public switched telephone network (PSTN), a mobile telephone network, a cellular telephone network, or a VoIP telephone network. As shown, the network 118 can be coupled to a customer telephone 120. In an alternative embodiment, any number of customer telephones 120 can be coupled to the network 118.

Figure 6:
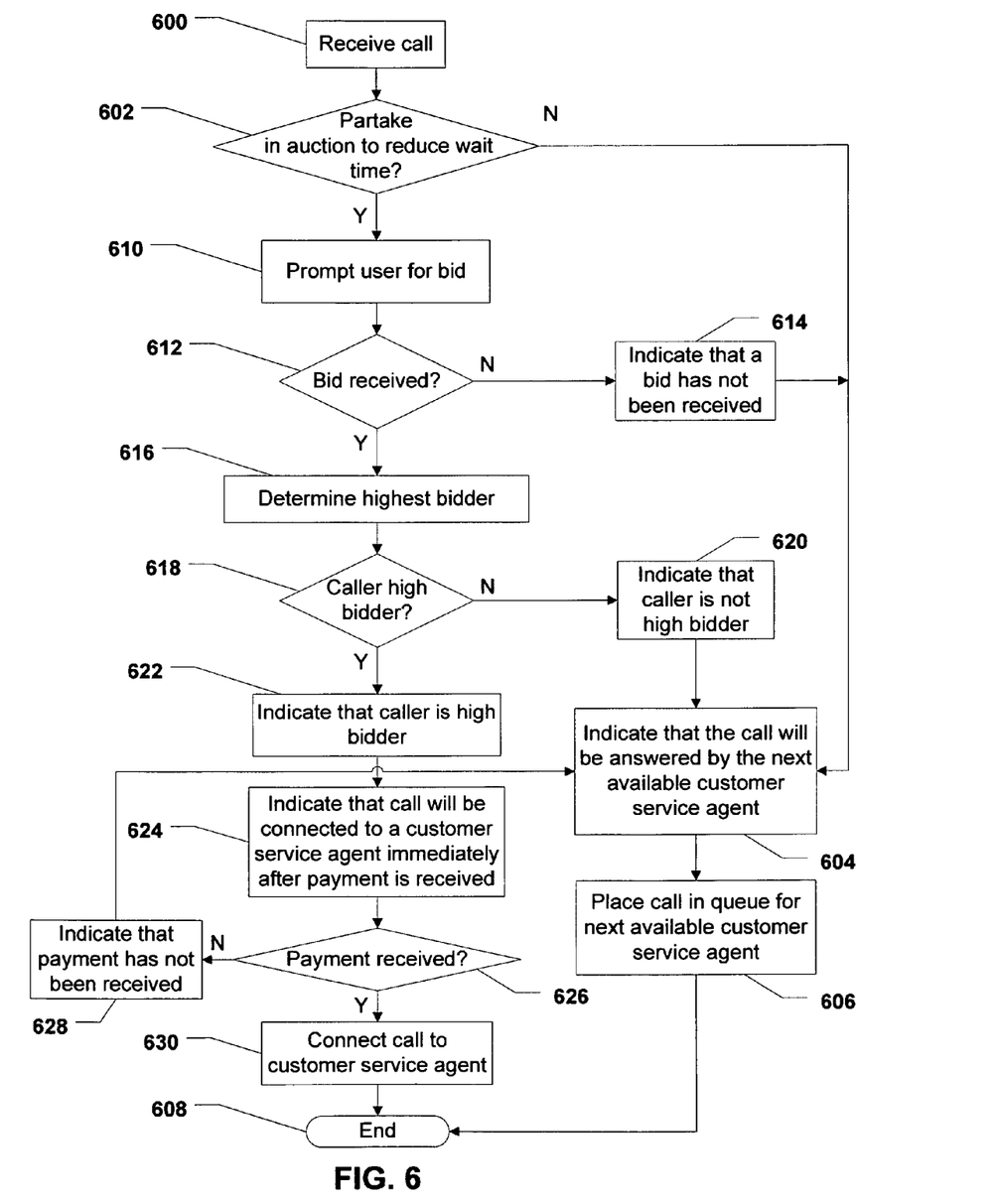
FIG. 6 is a flow chart illustrating a fifth method of managing incoming calls at a call center.

As illustrated in FIG. 1, the IVR server 102 includes a processor 122 and a computer readable medium 124 that is accessible to the processor 122. In a particular embodiment, the computer readable medium 124 is a memory, e.g., a read-only memory (ROM) or a random access memory (RAM). FIG. 1 further indicates that an IVR application 126 can be embedded within the computer readable medium. FIG. 6, described below, illustrates a general computing system that may serve as the IVR server 102.

In a particular embodiment, the IVR server 102 can receive one or more telephone calls from the customer telephone 120 via the network 118. The telephone calls can be forwarded directly to one of the customer service agent telephones 108, 112, 116. Alternatively, the telephone calls can be placed in the call transfer queue 104 and transferred to a first available customer service agent telephone to be answered by a customer service agent. The IVR application 126 can offer the caller one or more options to alter a call wait time associated with the telephone call. Each option can include a relatively nominal fee that can be paid in exchange for implementing a selected option.

In a particular embodiment, the IVR application 126 can offer the caller an option to pay a fixed price for instant service. For example, the IVR application 126 can state, "To be connected immediately for a charge of five dollars, press one." Also, the IVR application 126 can offer the caller an option to buy down the wait time in increments, e.g., the IVR application 126 can state, "The current wait time is 34 minutes. You may reduce your wait time by a minute for each dollar you are willing to pay. Please enter the number of minutes/dollars you want."

In another particular embodiment, the IVR application 126 can offer the caller an option to partake in an auction for the services of the next available customer service agent. For example, the auction can be a live auction where the caller can bid against other callers waiting the on-hold queue. Further, in a particular embodiment, the IVR application 126 can offer the caller an option to get domestic help instead of offshore help. Such an option may be beneficial to callers who have difficulties with accents or who have personal or political agendas against outsourcing.

In yet another particular embodiment, the IVR application 126 can offer a caller an option to pay to bypass an automated help system, e.g., the IVR application 126. For example, the IVR application 126 can indicate, "To be put in queue for the next available representative, press one and your account will be charged five dollars. Otherwise, you will be transferred to an automated help application."

In an illustrative embodiment, the caller can pay in many ways. For example, before being connected the caller can be prompted using an automated system to enter credit card information, bank account information, or the account number for the company that the caller is calling. For options where the caller is connected to a customer service agent, the customer service agent can process the payment transaction before handling the caller's request. In a situation in which the caller has an account with the company called, the charge can be added to a monthly bill or invoice separately.

Figure 2:
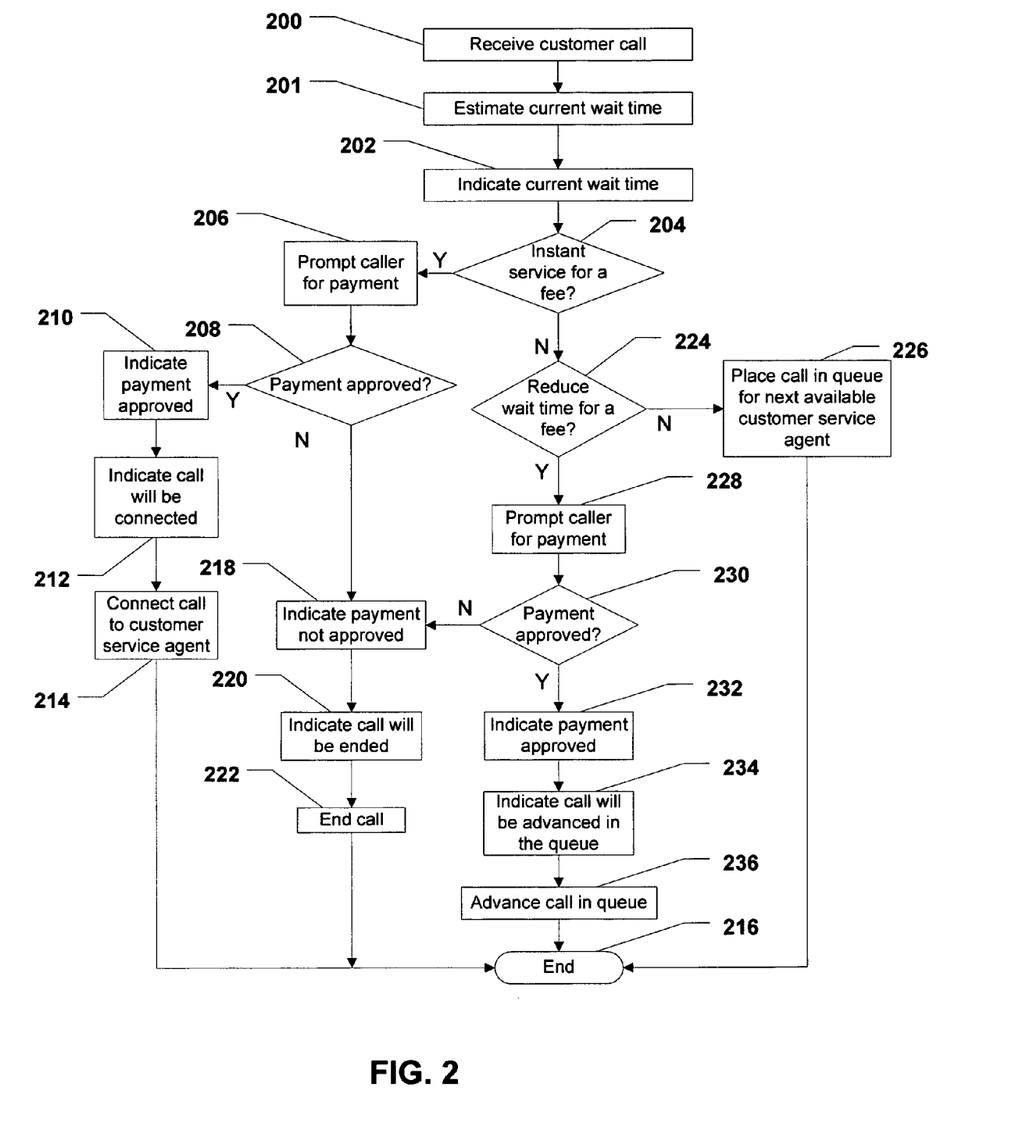
FIG. 2 is a flow chart illustrating a first method of managing incoming calls at a call center.

Referring to FIG. 2, a method of managing incoming telephone calls at a customer service center is shown and commences at block 200. At block 200, an interactive voice response (IVR) server receives a customer call. At block 201, the IVR server estimates a current wait time. Next, at block 202, the IVR server indicates the current wait time. Moving to decision step 204, the IVR server prompts the caller with an instant service option to provide the caller with instant service for a fee. If the user selects the instant service option, the method moves to block 206 and the IVR server prompts the user for payment. Next, at decision step 208, the IVR server determines whether the payment is approved. If payment is approved, the method proceeds to block 210 and the IVR server indicates that the payment is approved. At block 212, the IVR server indicates that the call will be connected. Moving to block 214, the IVR server connects the telephone call to a customer service agent directly. The method then ends at state 216.

Returning to decision step 208, if payment is not approved, the method continues to block 218 and the IVR server indicates that the payment is not approved. At block 220, the IVR server indicates that the call will be ended. Then, the telephone call is ended at block 222. The method ends at state 216.

Returning to decision step 204, when the user declines the instant service option, the method proceeds to decision step 224 and the IVR server prompts the caller with a reduced wait time option to reduce the caller's wait time for a fee. If the caller declines the reduced wait time option, the method moves to block 226 and the IVR server places the call in a queue to be answered by the next available customer service agent. Conversely, at decision step 224, when the user selects the reduced wait time option, the method continues to block 228 and the IVR server prompts the caller for payment.

Moving to decision step 230, the IVR server determines whether the payment is approved. If the payment is not approved, the method proceeds to block 218 and continues as described. On the other hand, when payment is approved, the method continues to block 232 and the IVR server indicates that the payment is approved. Thereafter, at block 234, the IVR server indicates that the call will be advanced in the on-hold queue. At block 236, the telephone call is advanced in the on-hold queue, e.g., by a fixed amount or by a variable amount. The method then ends at state 216.

In the exemplary embodiment depicted in FIG. 2, multiple payment options are available. For example, a caller can simply have any fees automatically billed directly to the caller's telephone bill. Otherwise, a caller can input a credit card number and have any fees billed to the credit card. Additionally, if the caller has an account with the business associated with the customer service center called, the fee can be billed to the caller's account.

Figure 3:
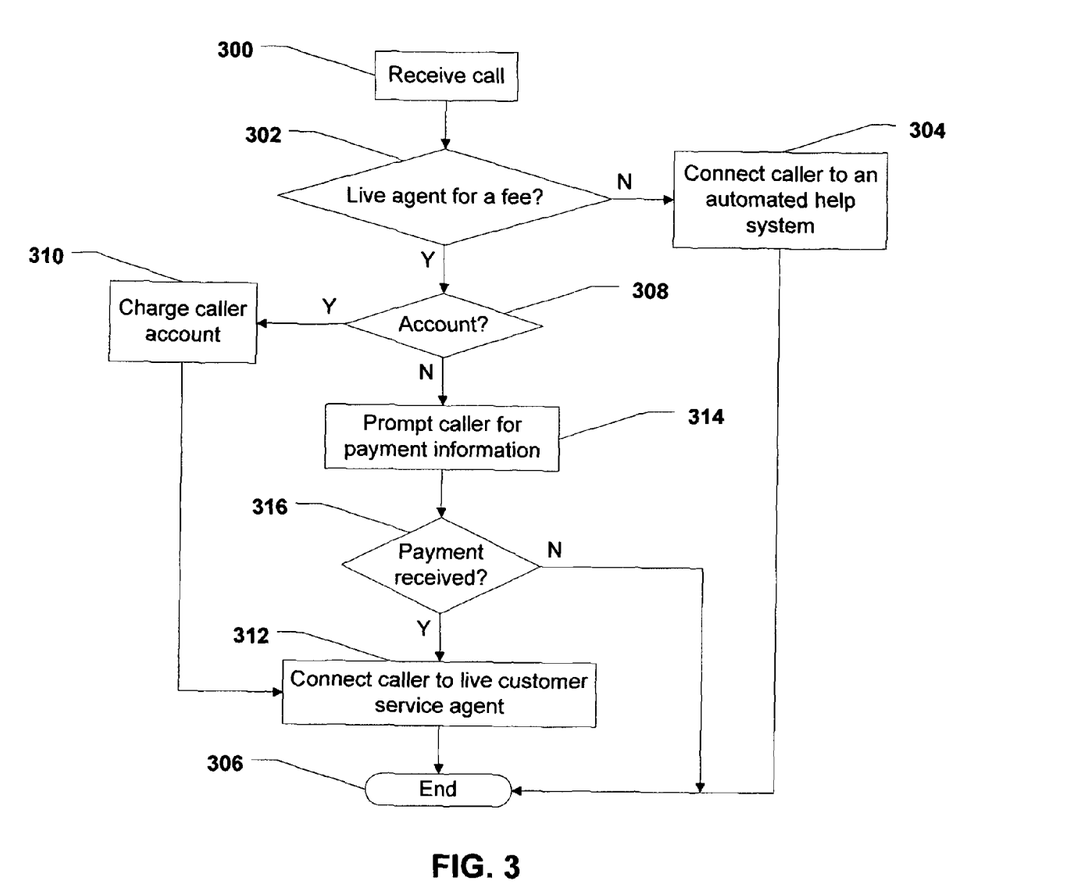
FIG. 3 is a flow chart illustrating a second method of managing incoming calls at a call center.

FIG. 3 depicts another method of managing incoming calls at a customer service center. At block 300, an IVR server at the customer service center receives a telephone call. At decision step 302, the IVR server prompts the caller with a live agent option, e.g., the IVR server prompts the user to continue to an automated help system for free or pay a small fee for a live agent. When the live agent option is declined, the method proceeds to block 304 and the IVR server connects the caller to an automated help system. The method then ends at state 306.

Returning to decision step 302, when the caller selects the live agent option, the method proceeds to decision step 308 and the IVR server determines whether the caller has an account with the business associated with the customer service center. If the caller has an account, the method moves to block 310 and caller's account is charged with the fee. Thereafter, at block 312, the IVR server connects the caller to a live customer service agent. Then, the method ends at state 306.

Returning to decision step 308, if the caller does not have an account, the method proceeds to block 314 and the UVR server prompts the caller for payment information. At decision step 316, the IVR server determines whether payment is received. If payment is not received, the method ends at state 306. Otherwise, if payment is received, the method proceeds to block 312 and the IVR server connects the caller to a live customer service agent. The method then ends at state 306.

Figure 4:
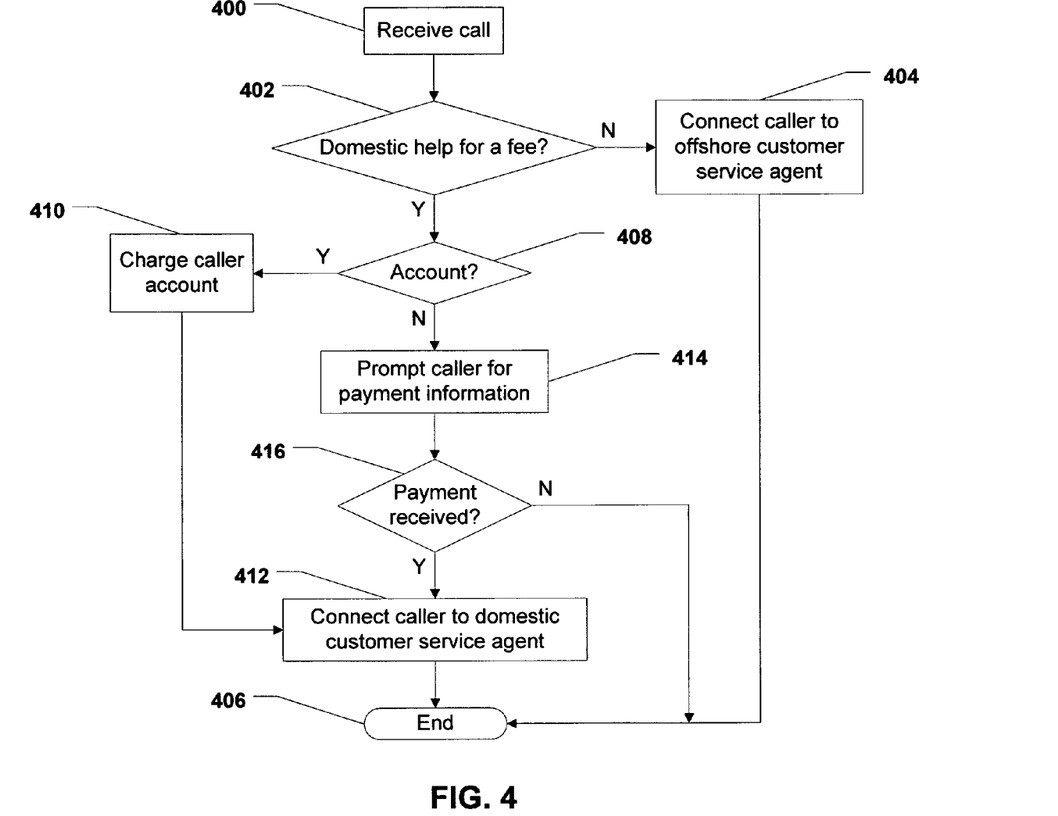
FIG. 4 is a flow chart illustrating a third method of managing incoming calls at a call center.

FIG. 4 depicts another method of managing incoming calls at a customer service center. At block 400, an IVR server at the customer service center receives a telephone call. At decision step 402, the IVR server prompts the caller with a domestic help option to provide domestic help to the caller for a fee. When the domestic help option is declined, the method proceeds to block 404 and the IVR server connects the caller to an offshore customer service agent. The method then ends at state 406.

Returning to decision step 402, when the caller selects the domestic help option, the method proceeds to decision step 408 and the IVR server determines whether the caller has an account with the business associated with the customer service center. If the caller has an account, the method moves to block 410 and caller's account is charged with the fee. Thereafter, at block 412, the IVR server connects the caller to a domestic customer service agent. Then, the method ends at state 406.

Returning to decision step 408, if the caller does not have an account, the method proceeds to block 414 and the IVR server prompts the caller for payment information. At decision step 416, the IVR server determines whether payment is received. If payment is not received, the method ends at state 406. Otherwise, if payment is received, the method proceeds to block 412 and the IVR server connects the caller to a domestic customer service agent. The method then ends at state 406.

Figure 5:
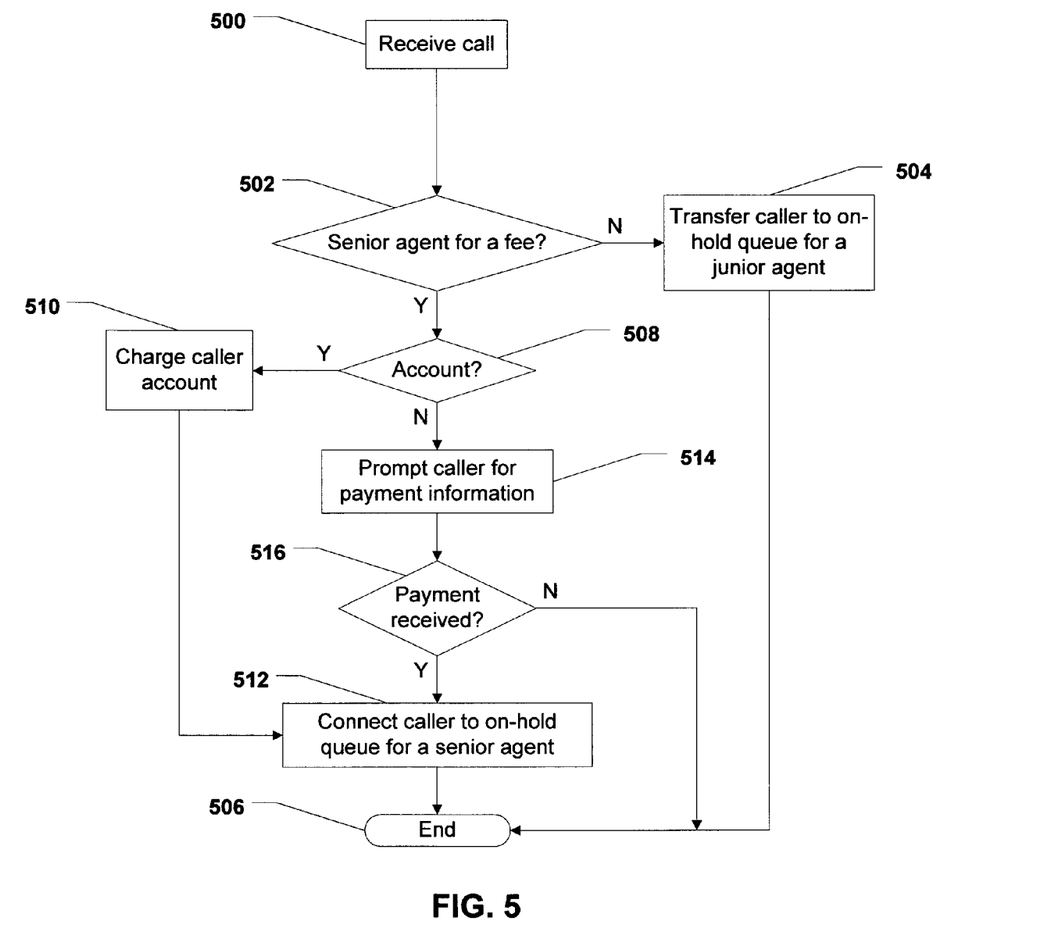
FIG. 5 is a flow chart illustrating a fourth method of managing incoming calls at a call center.

FIG. 5 depicts another method of managing incoming calls at a customer service center. At block 500, an IVR server at the customer service center receives a telephone call. At decision step 502, the IVR server prompts the caller with a senior agent help option to provide help from a senior customer service agent to the caller for a fee. When the senior agent help option is declined, the method proceeds to block 504 and the IVR server connects the caller to an on-hold queue for a junior customer service agent. The method then ends at state 506. In a particular embodiment, the senior customer service agent may possess greater skills than the junior customer service agent. Further, the senior customer service agent may provide better service to the caller than the junior customer service agent. Additionally, the system may include multiple senior customer service agents and multiple junior customer service agents.

Returning to decision step 502, when the caller selects the senior agent help option, the method proceeds to decision step 508 and the IVR server determines whether the caller has an account with the business associated with the customer service center. If the caller has an account, the method moves to block 510 and caller's account is charged with the fee. Thereafter, at block 512, the IVR server connects the caller to a domestic customer service agent. Then, the method ends at state 506.

Returning to decision step 508, if the caller does not have an account, the method proceeds to block 514 and the IVR server prompts the caller for payment information. At decision step 516, the IVR server determines whether payment is received. If payment is not received, the method ends at state 506. Otherwise, if payment is received, the method proceeds to block 512 and the IVR server connects the caller to an on-hold queue for a senior customer service agent. The method then ends at state 506.

Referring to FIG. 6, another method of managing calls to a customer service center is shown and begins at block 600. At block 600, an IVR server at the customer service center receives a telephone call. At block 602, the IVR server prompts the caller with an auction option to partake in an auction to reduce wait time at the customer service center. When the caller declines the auction option, the method proceeds to block 604 and the IVR server indicates that the telephone call will be answered by the next available customer service agent. At block 606, the IVR server places the telephone call in a call transfer queue for the next available customer service agent. Then, the method ends at state 608.

Returning to decision step 602, when the caller selects the auction option, the method continues to block 610 and the caller is prompted for a bid. At decision step 612, the IVR server determines whether a bid is received from the caller. If a bid is not received, the method proceeds to block 614 and the IVR server indicates to the caller that a bid has not been received. Thereafter, the method proceeds to block 604 and continues as described. Conversely, when a bid is received, the method proceeds to block 616 and the IVR server determines the high bidder. In a particular embodiment, the IVR server handles the auction, e.g., the IVR server can prompt all callers that are waiting in an on-hold queue to submit a bid. Further, the IVR server can compare the bids received to determine the high bidder.

Proceeding to decision step 618, the IVR server determines whether the caller is the high bidder. If the caller is not the high bidder, the method proceeds to block 620 and the IVR server indicates that caller is not the high bidder. Then, the method proceeds to block 604 and continues as described. Conversely, at decision step 618, when the caller is the high bidder, the method moves to block 622 and the IVR server indicates that the caller is the high bidder. At block 624, the IVR server indicates that the telephone call will be connected to a customer service agent immediately after payment is received.

Moving to decision step 626, the IVR server determines whether payment is received. If payment is not received, the method proceeds to block 628 and the IVR server indicates that payment has not been received. Thereafter, the method moves to block 604 and continues as described. On the other hand, when payment is received, the method proceeds to block 630 and the IVR server connects the telephone call to a customer service agent. The method then ends at state 608.

Figure 7:
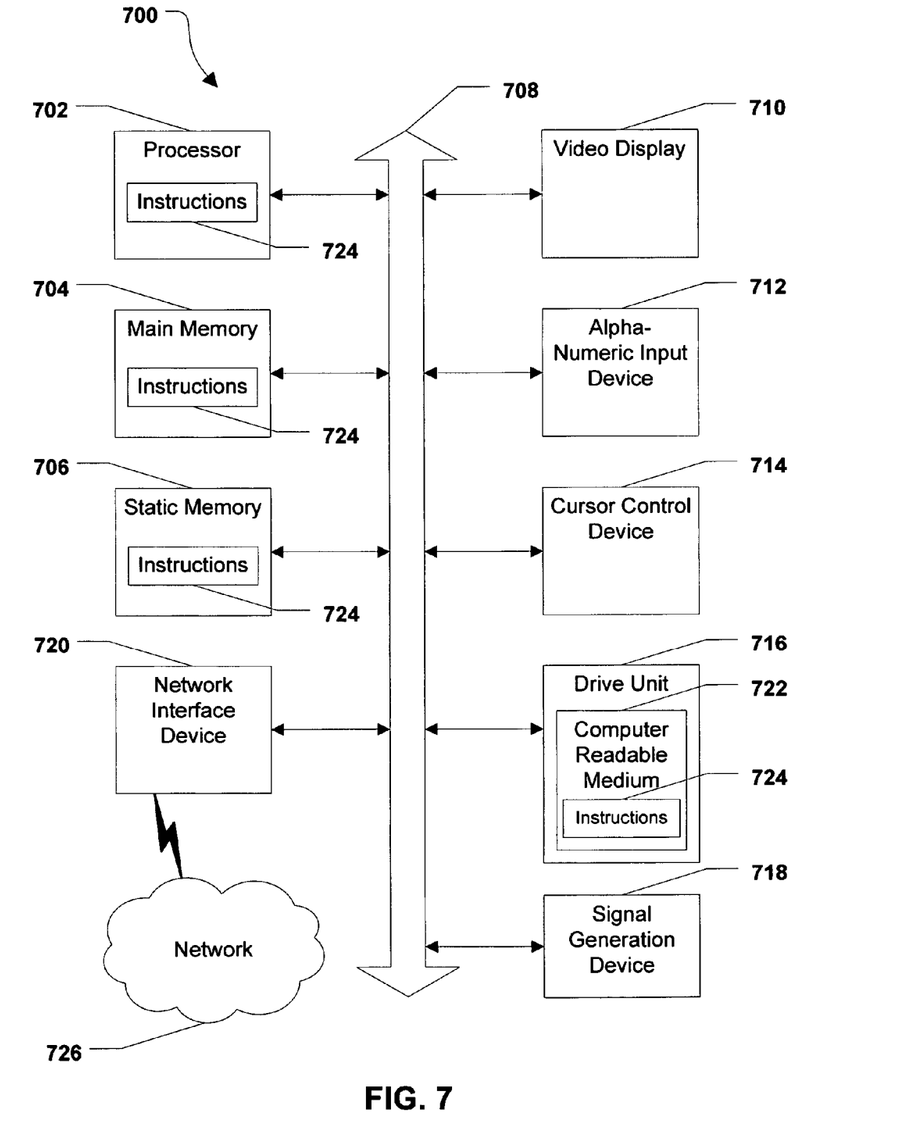
FIG. 7 is a block diagram that is representative of a general computing system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

With the configuration of structure described above, the system and method of managing incoming telephone calls at a call center provides one or more options to a caller that would allow the caller to alter their on-hold wait time at the call center. For example, the system and method provides a bypass option that will allow a user to bypass an automated call answering system, e.g., an interactive voice response (IVR) system.

Also, the system and method can provide an instant service option that can be selected to connect the caller to a call service agent immediately. Further, the system and method can provide a reduce wait time option that the caller can select in order to advance the caller in a call transfer queue and reduce the caller's on hold wait time. The system and method also provides an auction option that a user can select in order to partake in an auction with other caller's for a chance at reducing the caller's on hold wait time. Additionally, the system and method provides a domestic service option. A caller can select the domestic service option in order to speak with a domestic customer service agent.

Further, virtually call centers operate as a cost center rather than a revenue center. The system and method disclosed herein can allow a call center to collect income that may offset, cover, or exceed the cost of operating the call center. Thus, the system and method can potentially provide a profit to the operator of the call center. Additionally, the system and method disclosed herein can let the customer make the cost versus quality decision.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   providing wireline telephone service to a residence for a customer to place telephone calls;
   receiving a telephone call at a customer service center;
   prompting a caller of the telephone call to input a monetary value to reduce a wait time to receive customer service, wherein an amount of time reduced from the wait time corresponds to the monetary value according to a fixed monetary value per minute rate;
   prompting the caller with a senior agent help option to connect the telephone call to a next available senior customer service agent for a fee, wherein the next available senior customer service agent has a higher customer service skill ranking than a junior customer service agent;
   connecting the caller to a first on-hold queue associated with junior customer service agents when the senior agent help option is declined; and
   in response to selection of the senior agent help option:
      determining whether the caller has an account associated with the customer service center;
      when the caller has an account associated with the customer service center, charging the fee to the account and connecting the caller to a second on-hold queue associated with senior customer service agents;
      when the caller does not have an account associated with the customer service center, prompting the caller for payment information; and
      upon receipt of the payment information from the caller, placing the caller in the second on-hold queue associated with senior customer service agents.

2. The method of claim 1, further comprising providing information indicating a current wait time when the senior agent help option is declined.

3. The method of claim 1, further comprising indicating a current wait time before prompting the caller with the senior agent help option.

4. The method of claim 1, wherein the fee associated with connecting the telephone call to the next available senior customer service agent includes a fixed price.

5. The method of claim 1, wherein the fee associated with connecting the telephone call to the next available senior customer service agent is determined based on a current wait time.

6. The method of claim 1, wherein each minute of the amount of time corresponds to each dollar of the monetary value.

7. A method comprising:
   receiving a telephone call at a customer service center;
   prompting a caller of the telephone call to input a monetary value to reduce a wait time to receive customer service, wherein an amount of time reduced from the wait time corresponds to the monetary value according to a fixed monetary value per minute rate;
   prompting the caller with a domestic agent help option to connect the telephone call to a next available domestic customer service agent for a fee;
   connecting the caller to a first on-hold queue when the domestic agent help option is declined; and
   in response to selection of the domestic agent help option:
      determining whether the caller has an account associated with the customer service center;
      when the caller has an account associated with the customer service center, charging the fee to the account and connecting the caller to a second on-hold queue associated with domestic customer service agents;
      when the caller does not have an account associated with the customer service center, prompting the caller for payment information; and
      upon receipt of the payment information from the caller, placing the caller in the second on-hold queue associated with domestic customer service agents.

8. The method of claim 7, wherein the method further comprises placing the call in the first on-hold queue when the payment information is not received, wherein the first on-hold queue is associated with offshore customer service agents.

9. The method of claim 7, wherein the first on-hold queue is associated with offshore customer service agents.

10. The method of claim 7, further comprising providing information indicating the wait time before prompting the caller to input the monetary value.

11. The method of claim 7, wherein each minute of the amount of time corresponds to each dollar of the monetary value.

12. A call management system comprising:
   a plurality of customer service agent communication devices associated with a customer service center; and
   an interactive voice response server coupled to the plurality of customer service agent communication devices, wherein the interactive voice response server comprises:
   a processor; and a computer readable storage medium accessible to the processor, the computer readable storage medium including instructions that, when executed by the processor, cause the processor to perform operations comprising:
   receiving a telephone call at the customer service center;
   prompting a caller of the telephone call to input a monetary value to reduce a wait time to receive customer service, wherein an amount of time reduced from the wait time corresponds to the monetary value according to a fixed monetary value per minute rate;

prompting the caller with a senior agent help option to connect the telephone call to a next available senior customer service agent for a fee, wherein the next available senior customer service agent has a higher customer service skill ranking than a junior customer service agent;

connecting the caller to a first on-hold queue associated with junior customer service agents when the senior agent help option is declined; and in response to selection of the senior agent help option:
determining whether the caller has an account associated with the customer service center in response to selection of the senior agent help option;
charging the fee to the account and connecting the caller to a second on-hold queue associated with senior customer service agents when the caller has an account associated with the customer service center; and
prompting the caller for payment information in when the caller does not have an account associated with the customer service center and placing the caller in the second on-hold queue associated with senior customer service agents upon receipt of the payment information from the caller.

13. The call management system of claim 12, wherein the operations further comprise providing information indicating a current wait time.

14. The call management system of claim 13, wherein the information indicating the current wait time is provided when the senior agent help option is declined.

15. The call management system of claim 13, wherein the information indicating the current wait time is provided before prompting the caller with the senior agent help option.

16. The call management system of claim 13, wherein the fee associated with connecting the telephone call to the next available senior customer service agent is determined based on the current wait time.

17. The call management system of claim 12, wherein the fee associated with connecting the telephone call to the next available senior customer service agent includes a fixed price.

18. The call management system of claim 12, wherein each minute of the amount of time corresponds to each dollar of the monetary value.

\* \* \* \* \*